(12) United States Patent
't Hooft

(10) Patent No.: US 9,304,757 B2
(45) Date of Patent: *Apr. 5, 2016

(54) PERIPHERAL DEVICE DETECTION WITH SHORT-RANGE COMMUNICATION

(71) Applicant: Google Inc., Mountain View, CA (US)

(72) Inventor: Maarten 't Hooft, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,484

(22) Filed: Jan. 26, 2015

(65) Prior Publication Data

US 2015/0135172 A1 May 14, 2015

Related U.S. Application Data

(63) Continuation of application No. 13/118,212, filed on May 27, 2011, now Pat. No. 8,943,229.

(60) Provisional application No. 61/428,483, filed on Dec. 30, 2010.

(51) Int. Cl.
*G06F 3/00* (2006.01)
*G06F 9/445* (2006.01)
(Continued)

(52) U.S. Cl.
CPC ............... *G06F 8/65* (2013.01); *G06F 1/1632* (2013.01); *G06F 13/10* (2013.01); *H04W 4/008* (2013.01); *H04B 5/0031* (2013.01); *H04B 5/0056* (2013.01)

(58) Field of Classification Search
CPC ......... G06F 8/65; G06F 13/10; G06F 1/1632; H04B 5/0031; H04B 5/0056; H04W 4/008
See application file for complete search history.

(56) References Cited

U.S. PATENT DOCUMENTS 7,730,224 B2   6/2010   Kikuchi
7,751,971 B2   7/2010   Chang et al.
(Continued)

FOREIGN PATENT DOCUMENTS

CN   101064882 A   10/2007
CN   101645955 A   2/2010
CN   101848273 A   9/2010

OTHER PUBLICATIONS

Office Action from U.S. Appl. No. 13/251,093, dated Nov. 15, 2011, 15 pp.
(Continued)

*Primary Examiner* — Eric Oberly
(74) *Attorney, Agent, or Firm* — Shumaker & Sieffert, P.A.

(57) ABSTRACT

In general, embodiments of the present disclosure are directed to techniques for configuring a mobile device according to detection of one or more peripheral devices in an environment using short-range wireless communication. In one example, a method includes, receiving, by a computing device that communicates with a peripheral device using short-range wireless communication, a unique identifier of the peripheral device. If the computing device recognizes the unique identifier of the peripheral device, the computing device may determine a configuration operation based on the unique identifier that changes a current operating state of at least one application executing on the computing device to a different operating state. If the computing device does not recognize the unique identifier of the peripheral device, the computing device may send a lookup request to a network resource external to the computing device that requests data specifying the configuration operation for the computing device.

20 Claims, 6 Drawing Sheets

(51) Int. Cl.
*G06F 13/10* (2006.01)
*G06F 1/16* (2006.01)
*H04W 4/00* (2009.01)
*H04B 5/00* (2006.01)

(56) References Cited

U.S. PATENT DOCUMENTS

| | | | |
|---|---|---|---|
| 7,913,020 B2 | 3/2011 | Acosta et al. | |
| 7,991,406 B2 | 8/2011 | Korkalo et al. | |
| 2002/0039909 A1* | 4/2002 | Rankin | 455/558 |
| 2003/0220988 A1 | 11/2003 | Hymel | |
| 2004/0087318 A1 | 5/2004 | Lipovski | |
| 2004/0235464 A1 | 11/2004 | Korkalo et al. | |
| 2005/0170849 A1 | 8/2005 | McClelland | |
| 2006/0046651 A1 | 3/2006 | Hazell et al. | |
| 2006/0173576 A1* | 8/2006 | Goerg | A47K 10/36 700/236 |
| 2007/0043720 A1* | 2/2007 | Koenig et al. | 707/6 |
| 2007/0206786 A1 | 9/2007 | Chakraborty | |
| 2008/0014966 A1* | 1/2008 | Chakraborty et al. | 455/456.4 |
| 2009/0036165 A1* | 2/2009 | Brede | 455/558 |
| 2009/0325484 A1 | 12/2009 | Lele et al. | |
| 2010/0078471 A1 | 4/2010 | Lin et al. | |
| 2010/0078475 A1 | 4/2010 | Lin et al. | |
| 2010/0082444 A1 | 4/2010 | Lin et al. | |
| 2010/0082445 A1 | 4/2010 | Hodge et al. | |
| 2010/0082455 A1 | 4/2010 | Rosenblatt et al. | |
| 2010/0082489 A1 | 4/2010 | Lin et al. | |
| 2010/0082490 A1 | 4/2010 | Rosenblatt et al. | |
| 2010/0082491 A1 | 4/2010 | Rosenblatt et al. | |
| 2010/0082784 A1 | 4/2010 | Rosenblatt et al. | |
| 2010/0125492 A1 | 5/2010 | Lin et al. | |
| 2010/0222021 A1* | 9/2010 | Balsan et al. | 455/406 |
| 2010/0231359 A1* | 9/2010 | Cho | G06Q 30/02 340/10.1 |
| 2010/0302005 A1 | 12/2010 | Popovski | |
| 2011/0055546 A1* | 3/2011 | Klassen et al. | 713/150 |
| 2011/0251892 A1 | 10/2011 | Laracey | |
| 2011/0270712 A1 | 11/2011 | Wood et al. | |
| 2011/0270751 A1 | 11/2011 | Csinger et al. | |
| 2011/0307318 A1 | 12/2011 | LaPorte et al. | |
| 2012/0054399 A1 | 3/2012 | Lemarchand | |

OTHER PUBLICATIONS

International Search Report and Written Opinion of International Application No. PCT/US2011/066928, dated May 24, 2012, 13 pp.
Anokwa, "Beyond Device Pairing: New Interactions on NFC Enabled Mobile Phones," [online]. May 18, 2007. Retrieved from the Internet: <http://www.cs.washington.edu/homes/yanokwa/resources/anokwa_quals_paper.pdf> (12 pgs.).
Schilit et al., "Context-Aware Computing Applications," [online]. In Proceedings of the Workshop on Mobile Computing Systems and Applications, 1994. Retrieved from the Internet: <http://nano.xerox.com/want/papers/parctab-wmc-dec94.pdf> (7 pgs.).
Krishnamurthy et al., "Context-based Adaptation of Mobile Phones Using Near-Field Communication," [online]. May 21, 2007. Retrieved from the Internet: <http://domino.watson.ibm.com/comm/research_people.nsf/pages/chakraborty.pubs.html/$FILE/chakraborty_mobiquitous06.pdf> (10 pgs.).
Moore, "The Potential Use of Radio Frequency Identification Devices for Active Monitoring of Blood Glucose Levels," [online]. J. Diabetes Sci Technol., Jan. 2009 (in print and online), vol. 3(1), pp. 180-183. Retrieved from the Internet: <http://www.ncbi.nlm.nih.gov/pmc/articles/PMC2769845/> (6 pgs.).
Notice of Allowance from U.S. Appl. No. 13/251,093, dated Feb. 22, 2012, 16 pp.
Office Action from counterpart Chinese Patent Application No. 201180068666.5, dated May 28, 2014, 13 pp.
International Preliminary Report on Patentability and Written Opinion of International Application No. PCT/US2011/066928, dated Jul. 11, 2013, 10 pp.

* cited by examiner

PERIPHERAL DEVICE DETECTION WITH SHORT-RANGE COMMUNICATION

RELATED APPLICATIONS

This application is a continuation of U.S. application Ser. No. 13/118,212, filed, May 27, 2011 which claims the benefit of U.S. Provisional Application No. 61/428,483, filed Dec. 30, 2010, the entire content of each of which is incorporated by reference.

TECHNICAL FIELD

This disclosure relates to communication implemented via radio frequency signal transmission over a short distance between a communication device and a receiver.

BACKGROUND

A user may interact with applications executing on a computing device (e.g., mobile phone, tablet computer, smart phone, or the like). For instance, a user may install, view, or delete an application on a computing device.

In some instances, a user may use a mobile device (e.g., mobile phone, tablet computer, smart phone, or the like) in proximity to other devices. For instance, a user may place a mobile device on a docking station.

SUMMARY

In one example, a method includes receiving, by a computing device that communicates with a peripheral device using short-range wireless communication, a unique identifier of the peripheral device. If the computing device recognizes the unique identifier of the peripheral device the computing device may determine a configuration operation for the computing device based on the unique identifier, wherein the configuration operation changes a current operating state of at least one application executing on the computing device to a different operating state. If the computing device does not recognize the unique identifier of the peripheral device, the computing device may send a lookup request to a network resource external to the computing device, wherein the lookup request includes a request to the network resource for data specifying the configuration operation for the computing device based on the unique identifier of the peripheral device.

In one example, a computer-readable storage medium is encoded with instructions that cause one or more processors of a computing device to receive, by the computing device that communicates with a peripheral device using short-range wireless communication, a unique identifier of the peripheral device. If the computing device recognizes the unique identifier of the peripheral device, the computing device may determine a configuration operation for the computing device based on the unique identifier, wherein the configuration operation changes a current operating state of at least one application executing on the computing device to a different operating state. If the computing device does not recognize the unique identifier of the peripheral device, the computing device may send a lookup request to a network resource external to the computing device, wherein the lookup request includes a request to the network resource for data specifying the configuration operation for the computing device based on the unique identifier of the peripheral device.

In one example, a computing device includes one or more processors. The computing device also includes a short-range communication device to receive a unique identifier of a peripheral device. The computing device further includes an application installed on the computing device and operable by the one or more processors to, if the computing device recognizes the unique identifier of the peripheral device, determine a configuration operation based on the unique identifier, wherein the configuration operation changes a current operating state of at least one application executing on the computing device to a different operating state. The computing device also includes means for sending a lookup request to a network resource if the computing device does not recognize the unique identifier of the peripheral device, wherein the lookup request includes a request to the network resource for data specifying the configuration operation for the computing device based on the unique identifier of the peripheral device.

DETAILED DESCRIPTION

Figure 1:
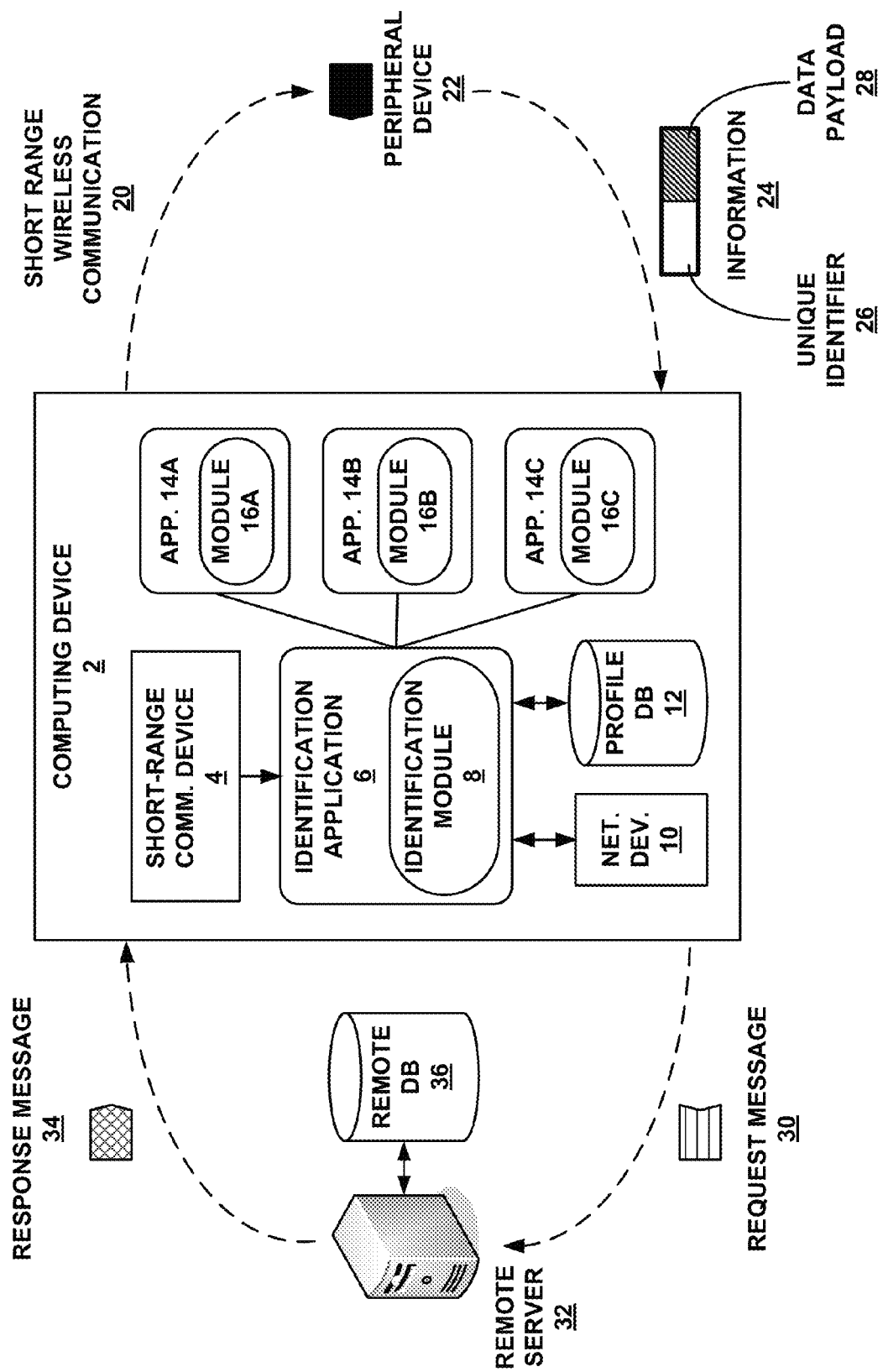
FIG. 1 is a block diagram illustrating an example of a computing device that is configured to execute one or more applications and an identification application, in accordance with one or more aspects of the present disclosure.

In general, embodiments of the present disclosure are directed to techniques for configuring a mobile device according to its present environment using short-range wireless communication. In a single day, a mobile device may be used in many different environments. For example, a mobile device may be charged and stored at a user's bedside throughout the night. During a morning vehicle commute, the user may place the mobile device in a vehicle dock of his or her vehicle. When the user arrives at work, the user may put the mobile device in an office docking station. Finally, at the end of the day, a user may interact with the mobile device in the user's living room, e.g., as a television remote control, where the mobile device may be in proximity to yet another dock. In each different environment, the user may wish for the mobile device to exhibit a different set of behaviors. For example, a user may prefer lower ringer and external volume settings while at work. In other examples, a user may prefer a navigation application to automatically execute when the mobile device is in a vehicle. In each case, manual intervention may be required by the user to configure the mobile device to its present environment.

The requirement of manual intervention for each environment may be eliminated by a mobile device that employs a short-range wireless communication technology. For example, a mobile device may use a short-range wireless communication technology to detect tags that are attached to other peripheral devices such as a car dock, desk dock, or other peripherals (e.g., wireless charger). Each tag may contain unique information corresponding to the environment in which it is placed and/or the type of peripheral device onto which it is placed. When the mobile device detects a particular tag, the mobile device may receive, for example, a serial number and data payload from the tag. In some examples, the mobile device may provide the data payload to applications executing on the mobile device. In some examples, settings of applications executing on the mobile device may be automatically modified based on the particular tag detected by the mobile device.

In one example, a mobile device may be equipped with a short-range communication device that is capable of communicating using a short-range wireless communication technology, such as Near Field Communication (NFC). The mobile device may also execute a short-range wireless application that receives data from the short-range communication device. In some examples, a user may identify various environments for which different mobile device behavior is desired. The user may initially place a short-range wireless communication tag on peripheral devices in each of the various environments. Each tag may contain, for example, a data payload. In one example, the data payload includes a unique identifier. When the mobile device is in physical proximity to the tag and thus in the environment associated with the tag, the short-range communication device may detect the tag. The mobile device may receive information that includes, for example, the data payload, which may be processed by the short-range wireless application executing on the mobile device. The short-range wireless application may make the data payload including the unique identifier available to other applications on the mobile device. Each application executing on the mobile device may, in some examples, be configured to the present environment according to the data payload and configuration operations associated with the unique identifier.

FIG. 1 is a block diagram illustrating an example of a computing device 2 that is configured to execute one or more applications 14A, 14B, 14C, and identification application 6 in accordance with one or more aspects of the present disclosure. Applications 14A, 14B, 14C may further include modules 16A, 16B, 16C respectively that perform various operations of the respective applications. Computing device 2, in some examples, includes or is a part of a portable computing device (e.g. mobile phone/netbook/laptop/tablet device) or a desktop computer. Computing device 2 may also connect to a network including a wired or wireless network using a network device 10.

In some examples, computing device 2 includes a short-range communication device 4. In one example, short-range communication device 4 is capable of short-range wireless communication 20 using a protocol such as Bluetooth® or Near-Field Communication. Short-range wireless communication 20, in some examples, includes wireless communications between computing device 2 and peripheral device 22 of approximately 100 meters or less.

Short-range wireless communication 20, in some examples, includes two different modes of operation. For example, short-range wireless communication 20 may include an active mode and a passive mode of operation. In an active mode of operation, computing device 2 may generate a first radio field that is received by peripheral device 22 in physical proximity to computing device 2. In response, peripheral device 22 may generate a second radio field that is received by short-range communication device 4. In this way, data may be communicated between computing device 2 and peripheral device 22.

In a passive mode of operation, load modulation techniques may be employed to facilitate data communication between computing device 2 and peripheral device 22. In a passive mode, peripheral device 22 does not generate a radio field in response to the radio field of short range communication device 3. Instead, peripheral device 22 may include electrical hardware that generates a change in impedance in response to a radio field. For example, short-range communication device 4 may generate a radio field that is received by peripheral device 22. Electrical hardware in peripheral device 22 may generate a change in impedance in response to the radio field. The change in impedance may be detected by short-range communication device 4. In this way, load modulation techniques may be used by computing device 2 to receive information from peripheral device 22. Other well-known modulation techniques including phase modulation and/or amplitude modulation may also be employed to facilitate data communication between computing device 2 and peripheral device 22.

In some examples, peripheral device 22 is another computing device similar to computing device 2. For example, peripheral device 22, in some examples, includes or is a part of a portable computing device (e.g. mobile phone/netbook/laptop/tablet device) or a desktop computer. In other examples, peripheral device 22 includes electrical hardware that generates a change in impedance in response to a radio field. In some examples, peripheral device 22 is a tag that includes electrical hardware, which generates a change in impedance in response to a radio field. In some examples, peripheral device 22 includes a tag that is attached to another device. For example, a tag may be attached to a peripheral device 22, e.g., a docking station, which is capable of holding computing device 2. In some examples, a docking station may provide power recharging to computing device 2 and/or network connectivity to computing device 2.

In one example, computing device 2 receives information 24 from peripheral device 22 in response to receiving a radio field generated by short-range communication device 4. In some examples, information 24 includes data that is stored and/or generated by peripheral device 22. In some examples, information 24 includes a unique identifier 26. In one example, unique identifier 26 includes data such as a serial number or other data that uniquely identifies peripheral device 22. For example, where two or more peripheral devices are present, each peripheral device is uniquely identified by a unique identifier. In some examples, information 24 includes a data payload 28. In one example, data payload 28 includes any data associated with peripheral device 22. In some examples, data payload 28 may include encrypted data. In other examples, data payload 28 may include a unique identifier. In some examples, data payload 28 contains information such as technical specifications pertaining to peripheral device 22. In one example, information 24 includes a cryptographic key. Identification application 6, may in some examples, select the cryptographic key from information 24 to determine if the peripheral device is trustworthy. If the peripheral device is trustworthy, identification application 6 may further communicate with peripheral device 22.

In one example, short-range communication device 4 receives information 24 from peripheral device 22. Identification application 6, in turn, receives information 24 from short-range communication device 4. In some examples, identification application 6 may include data and instructions executing on computing device 2. Identification application 6 may include identification module 8, which may perform various functions of identification application 6 described hereinafter. Identification application 6, in some examples, stores and retrieves unique identifiers and/or definitions of configuration operations in profile database 12. In some examples, a profile may include a definition of a configuration operation. In other examples, identification application 6 communicates with one or more applications executing on computing device 2, e.g., application 14A, 14B, 14C. For example, identification application 6 may communicate with one or more applications executing on computing device 2 using well-known interprocess communication techniques including, e.g., shared memory, messages, sockets, and/or pipes. Interprocess communication techniques are described for example purposes only and other forms of communication are also contemplated.

Identification application 6 may change a state of an application executing on computing device 2 by sending data to the application. In one example, a state of an application includes a unique configuration of information in the application at a point in time. For example, the state of an application includes data and a group of instructions executing to operate on the data at a point in time. In one example, identification application 6 sends data to an application executing on computing device 2 to modify the state of the application, e.g., application 14A. Application 14A may be an operating system executing on computing device 2. Identification application 6 may send data or instructions to application 14A to change the state of the operation system, e.g., lowering a volume setting.

Techniques of the present disclosure may be illustrated by way of an example that includes a mobile device placed in a docking station of an automobile. For example, it may be advantageous to change the state of one or more applications executing on computing device 2 according to the current environment of computing device 2. In one example, a user initially places a Near-Field Communication (NFC) tag on or near a peripheral device 22, e.g., a docking station, in an automobile. The docking station, in some examples, provides power to computing device 2 and/or connects to the automobile's audio system.

After attaching a NFC tag to peripheral device, the user may initiate identification application 6. In some examples, the user may register one or more applications executing on computing device 2, e.g., applications 14A, 14B, and 14C, with identification application 6. In some examples, registering an application with identification application 6 enables identification application 6 to communicate with the application.

In the current example, the user, using identification application 6, defines one or more configuration operations. In some examples, a definition of a configuration operation includes data and/or instructions that are executed by computing device 2. In some examples, a configuration operation changes the state of an application executing on computing device 2, e.g., by sending data to the application.

In the current example of a docking station in an automobile, a configuration operation is defined by a user and associated with unique identifier 26 of peripheral device 22 and application 14A. For example, application 14A may be executing on computing device 2 and registered with identification application 6. Using identification application 6, a user may define a configuration operation, e.g., increase ringer volume, associated with application 14A. The user may also associate unique identifier 26 with the configuration operation using identification application 6. Thus, the configuration operation, application 14A, and unique identifier 26A may be associated together. The definition of the association between the configuration operation, application 14A, and unique identifier 26A may be stored in and retrieved in profile database 12.

At a later point in time, in response to receiving information 24, identification application 6, in one example, retrieves the definition of the configuration operation from profile database 12 using unique identifier 26. For example, the user places computing device 2 in the docking station of the automobile. When the user places computing device 2 in the docking station of the automobile, in one example, computing device 2 is in physical proximity to peripheral device 22. Computing device 2 may receive information 24 that includes unique identifier 26 and data payload 28 using short-range communication, e.g. Near Field Communication.

Upon receiving information 24, identification application 6, in one example, selects unique identifier 26. In some examples, identification application 6 uses unique identifier 26 to identify the association between unique identifier 26 and the configuration operation. Using the identified association, identification application 6, in one example, retrieves the definition of the configuration operation based on unique identifier 26. Identification application 6 may then execute the configuration operation, which may increase the ringer volume. For example, prior to executing the configuration operation, the ringer volume may be set to a defined level. After executing the configuration operation, the ringer volume may be set to a new defined level that is higher than the level defined prior to the configuration operation. In this way, the execution of the configuration operation may increase the ringer volume. Thus, the higher ringer volume may enable the user to hear the ringer even in the presence of background noise.

In the current example, executing the configuration operation, e.g., increasing the ringer volume, changes the state of application 14A. For example, application 14A may be an operating system that controls the ringer volume of the computing device 2. In one example, the current state of application 14A includes a current ringer volume setting. Identification application 6, in the example, executes the configuration operation that in turn increases the current ringer volume setting, e.g., changes the state of application 14A. For example, identification application 6 may execute a configuration operation that sends data, e.g., a ringer volume setting, to application 14A. Application 14A may receive this data from identification application 6, and in response to the data, increase the ringer volume setting.

In some examples, computing device 2 receives information 24 but may not recognize information 24. For example, a user may not, in some examples, initially register an application with identification application 6. In other examples, a user does not define a configuration operation that is associated with unique identifier 26. In such examples, although the user has not associated information 24 with an application and/or a configuration operation, identification application 6 receives data that changes the state of an application in response to information 24 via a network connection.

For example, in FIG. 1, computing device 2 includes a network device 10. Network device 10 may be a network interface as described in FIG. 2. In some examples, network device 10 may be a network interface card, such as an Ethernet card, an optical transceiver, a radio frequency transceiver, or any other type of device that can send and receive information.

In some examples, network device 10 sends data to a network resource external to computing device 2, e.g., remote server 32. In FIG. 1, a remote server 32 may include one or more desktop computers, mainframes, minicomputers, or other computing devices capable of executing computer instructions and storing data. Technical details of remote server 32 are further discussed in the example of FIG. 2. Remote server 32 may connect to a network, e.g., the Internet, a wireless network, a wired network, or a fiber optic network.

In some examples, computing device 2 may be in proximity to peripheral device 22. Using the techniques described herein, computing device 2, in one example, receives information 24 using short-range communication device 4. In one example, identification application 6 selects unique identifier 26 to identify one or more configuration operations associated with unique identifier 26. In some examples, identification application 6 queries profile database 12, which may include one or more associations between unique identifiers and configuration operations.

In some examples, identification application 6 may determine that no associations exist in profile database 12 between unique identifier 16 and one or more configuration operations. In such examples, identification application 6 generates a lookup request. Identification application 6 may include in a lookup request a request for data and/or instructions that are used to change the state of an application executing on computing device 2. For example, identification application 6 may, in one example, include in request message 30 a lookup request, unique identifier 26, and/or data payload 28. Request message 30, in some examples, may include other additional information such as user credentials, information about applications executing on computing device 2, hardware and software specifications relating to computing device 2, and/or an identifier that may include a phone number, Media Access Controller address, or other unique identifier of computing device 2.

In some examples, identification application 6 sends request message 30 to remote server 32 using network device 10. For example, application 6 may establish a network connection with remote server 32 via a socket using a network address stored on computing device 2 that identifies remote server 32. Computing device 2 may further execute a network send function called by application 6 that receives request message 30 as an input value. A send network function may generate multiple network packets that include the contents of request message 30. Network device 10 may send each network packet to remote server 32. In one example, remote server 32 receives the network packets that include the contents of request message 30 via a network from computing device 2. Remote server 32 may reassemble the network packets to generate request message 30.

In some examples, remote server 32 includes one or more remote databases 36. For example, remote database 36 may include Relational Database Management System (RDBMS) software. In one example, remote database 36 may be a relational database and accessed using a Structured Query Language (SQL) interface that is well known in the art. Remote database 36 may alternatively be stored on a separate networked computing device and accessed by remote server 32 through a network interface or system bus. Remote database 36 may in other examples be an Object Database Management System (ODBMS), Online Analytical Processing (OLAP) database or other suitable data management system.

In some examples, remote server 32 processes the contents of request message 30 to generate data and/or instructions that change the state of an application executing on computing device 2. In one example, remote database 36 includes associations between unique identifiers and definitions of configuration operations. For example, remote database 36 may include data and/or instructions that define a configuration operation. In one example, a unique identifier may be associated with a configuration operation that mutes the ringer volume of computing device 2.

In one example, remote server 32 receives request message 30 containing unique identifier 26 and/or lookup request because computing device 2 does not recognize unique identifier 26. In one example remote server 32 selects unique identifier 26 from request message 30. In some examples remote server 32 queries remote database 36 to identify data and/or instructions that define one or more configuration operations associated with unique identifier 26 and/or a lookup request. For example, remote server 32 may retrieve a definition of a configuration operation to mute the ringer volume of computing device 2 from remote database 36. Remote server 32 may generate a response message 24 that contains the definition of the configuration operation. In some examples, response message 24 may include additional data that may be associated with the configuration operation. Remote server 32 may send response message 34 to computing device 2 via a network such as the Internet.

In one example, computing device 2 receives response message 34 from remote server 34 via network device 10. In some examples, identification application 6 selects data and/or instructions that define one or more configuration operations from response message 34. Identification application 6, in one example, executes the one or more configuration operations, which may in turn change the state of one or more applications executing on computing device 2. In one example, the data and/or instructions of response message 34 that define the configuration operation mute the ringer volume of computing device 2.

In some examples, identification application 6 may receive information 24 from peripheral device 22 but may not recognize unique identifier 26. Information 24 may include data that indicates computing device 2 may use a particular application associated with peripheral device 22; however, the application may not presently be installed on computing device 2. For example, peripheral device 22 may be attached to or in proximity to a television and may be associated with the television. Peripheral device 22 may include data that indicates application 6 may execute a remote control application on computing device 2. The remote control application may enable a user to use computing device 2 to change various settings of the television such as the current channel, volume, etc. Computing device 2 may not, however, presently include the remote control application.

In such examples remote server 32 may use unique identifier 26 to identify the remote control application. For example, application 6 may generate a lookup request that may be included in request message 30. The lookup request may indicate that application 6 does not recognize unique identifier 26 and may include unique identifier 26. Computing device 2 may send request message 30 to remote server 32. Remote server 32 may receive the lookup request and identify a remote control application based the contents of request message 30, e.g., unique identifier 26. Remote server 32 may generate remote message 34, which may include data usable by peripheral device 22 to retrieve the remote control application. For example, the data may include an identifier of the remote control application such as a Uniform Resource Identifier (URI). Upon receiving response message 34 from remote server 32, identification application 6 may notify the user that the remote control application is available for download and installation. In some examples, identification application 6 may further receive a user input from the user to install the remote control application. In other examples, application 6 may automatically select and/or download and install the remote control application automatically based on a user preference. In this way, applications associated with peripheral devices may be downloaded and installed by a computing device 2 if such applications are not initially installed when information 24 is received from peripheral device 22.

In one example use case, a user may place individual tags on a bedside dock, a vehicle dock, and a dock at work. The user may configure the mobile device to set the ringer volume to silent when the bedside dock is detected. When the vehicle dock is detected, the user may configure the mobile device to automatically execute a navigation application, set the mobile device ringer volume to high, and a play a particular music playlist. The user may also configure the mobile device to set the ringer volume to low when the dock at work is detected. As the mobile device is carried with the user to different environments throughout the day, e.g., home, vehicle, and work, the mobile device automatically configures itself according to the user's preferences as different tags are detected using the short-range wireless communication technology. In this way, the user may not be required to manually configure the mobile phone by the user in each particular location.

Various aspects of the disclosure may provide, in certain instances, one or more benefits and advantages. For example, identification application 6 may automate the configuration of computing device 2 when in proximity to peripheral device 22. Automating the configuration of computing device 2 may eliminate the need for the user to manually configure computing device 2 in each different environment. Eliminating the requirement of manual intervention may increase user productivity by allowing the user to focus on other tasks than manual configuration of computing device 2. In addition, aspects of the disclosure enable computing device 2 to configure applications even when a user has not provided initial configuration of applications 14A-14C.

Eliminating the need for initial configuration of applications may dramatically increase the flexibility of computing device 2 because the user need not necessarily, in some examples, provide advance configuration of applications for peripheral devices. As peripheral devices become more prevalent, the ability of computing device 2 to automatically configure applications in response to unrecognized unique identifiers becomes more valuable because manual user intervention is significantly reduced thereby increasing productivity. The aforementioned benefits and advantages are exemplary and other such benefits and advantages may be apparent in the previously-described non-limiting examples. While some aspects of the present disclosure may provide all of the aforementioned exemplary benefits and advantages, no aspect of the present disclosure should be construed to necessarily require any or all of the aforementioned exemplary benefits and advantages.

Various aspects of the disclosure may be operable only when the user has explicitly enabled such functionality. In addition, various aspects of the disclosure may be disabled by the user. Thus, a user may elect to prevent computing device 2 from sending request message 30 to remote server 32. In addition, a user may prevent computing device 2 from receiving response message 34 from remote server 32. Short-range wireless communication 20 may be disabled by the user and a user may therefore prevent receipt of information 24. More generally, privacy controls may be applied to all aspects of the disclosure based on a user's privacy preferences to honor the user's privacy preferences for opting in or opting out of the functionality described in this disclosure.

Figure 2:
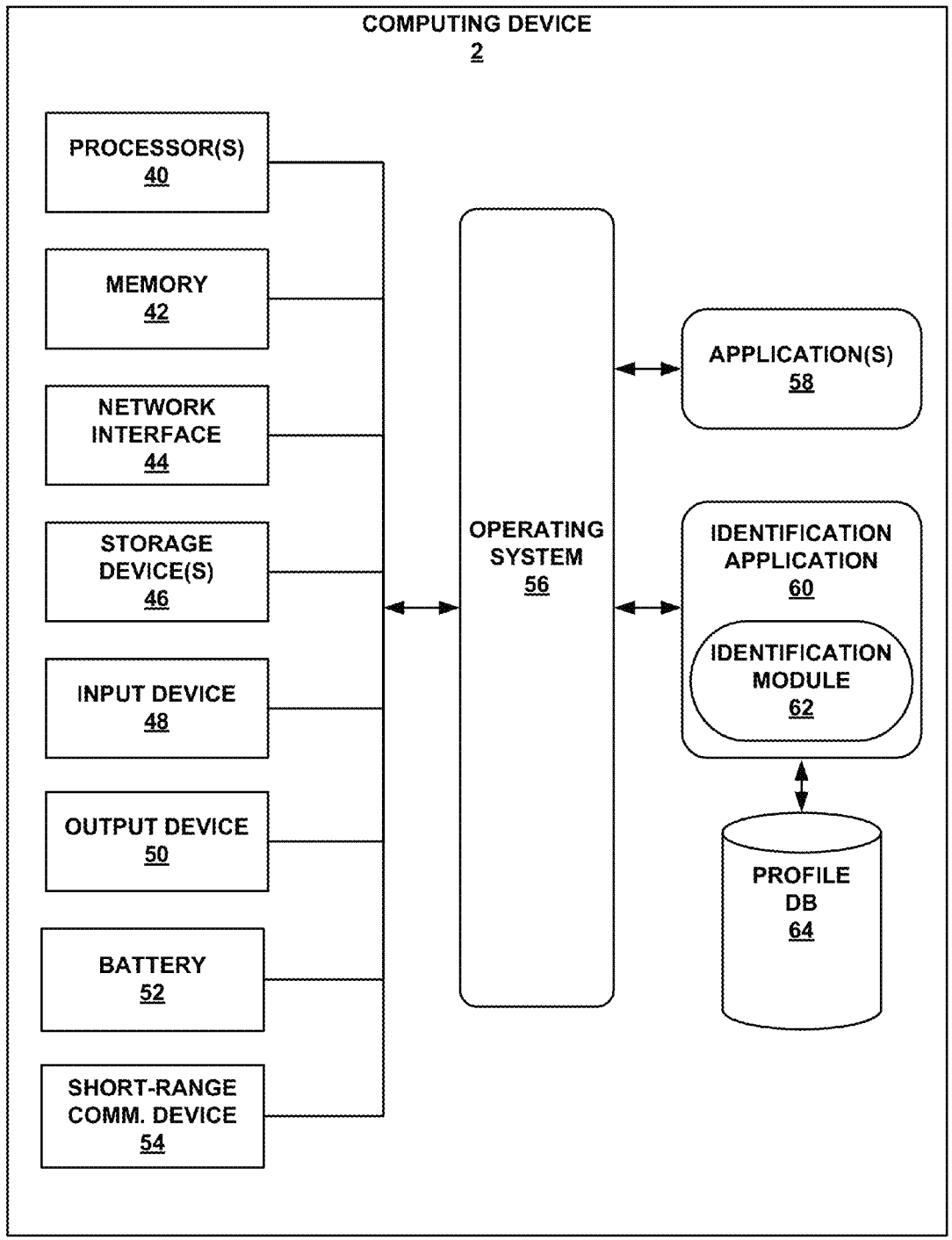
FIG. 2 is a block diagram illustrating further details of one example of the computing device shown in FIG. 1, in accordance with one or more aspects of the present disclosure.

FIG. 2 is a block diagram illustrating further details of one example of computing device 2 shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes one or more processors 40, memory 42, a network interface 44, one or more storage devices 46, input device 48, output device 50, battery 52 and short-range communication device 54. Computing device 2 also includes an operating system 56, which may include modules that are executable by computing device 2. Computing device 2, in one example, further includes one or more applications 58 and an identification application 60. One or more applications 58 and identification application 60 are also executable by computing device 2. Each of components 40, 42, 44, 46, 48, 50, 52, 54, 56, 58, 60, and 64 may be interconnected (physically, communicatively, and/or operatively) for inter-component communications.

Processors 40, in one example, are configured to implement functionality and/or process instructions for execution within computing device 2. For example, processors 40 may be capable of processing instructions stored in memory 42 or instructions stored on storage devices 46.

Memory 42, in one example, is configured to store information within computing device 2 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 2 (e.g., one or more of applications 58) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes a network interface 44. For example, network device 10 as shown in FIG. 1 may be a network interface 44. Computing device 2, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 2 utilizes network interface 44 to wirelessly communicate with an external device (not shown) such as a server, mobile phone, or other networked computing device.

Computing device 2, in one example, also includes one or more input devices 48. Input device 48, in some examples, is configured to receive input from a user through tactile, audio, or video feedback. Examples of input device 48 include a touch-sensitive and/or a presence-sensitive screen, mouse, a keyboard, a voice responsive system, or any other type of device for detecting a command from a user. In some examples, input device 48 includes a touch-sensitive screen, mouse, keyboard, microphone, or video camera.

One or more output devices 50 may also be included in computing device 2. Output device 50, in some examples, is configured to provide output to a user using tactile, audio, or video stimuli. Output device 50, in one example, includes a touch-sensitive screen, sound card, a video graphics adapter card, or any other type of device for converting a signal into an appropriate form understandable to humans or machines. Additional examples of output device 50 include a speaker, a cathode ray tube (CRT) monitor, a liquid crystal display (LCD), or any other type of device that can generate intelligible output to a user.

Computing device 2, in some examples, include one or more batteries 52, which may be rechargeable and provide power to computing device 2. Battery 52, in some examples, is made from nickel-cadmium, lithium-ion, or other suitable material.

Computing device 2, in some examples, includes one or more short-range communication devices 54. In some examples, short-range communication device 54 communicates wirelessly with other devices in physical proximity to short-range communication device 54, e.g., approximately 0-100 meters. In other examples, short-range communication device 54 reads a tag, e.g., an RFID tag, via a radio frequency signal. Some examples of short-range communication device 54 include a Bluetooth®, Near-Field Communication, or Ultra-Wideband radio.

Computing device 2 may include operating system 56. Operating system 56, in some examples, controls the operation of components of computing device 2. For example, operating system 56, in one example, facilitates the interaction of application 58 or identification application 60 with processors 40, memory 42, network interface 44, storage device 46, input device 48, output device 50, battery 52, and short-range communication device 54.

Computing device 2, in some examples, further includes identification application 60. Identification application 60, in one example, includes identification application 6 as shown in FIG. 1. Identification application 60, in one example, further includes an identification module 62. Identification module 62, in some examples, include instructions that cause identification application 60 executing on computing device 2 to perform the operations and actions described in FIG. 1-5. For example, in FIG. 1, when information 24 is received by computing device 2, identification module 62 of FIG. 2 may retrieve associated profiles from profile database 64. In other examples, identification module 62 may determine a configuration operation associated with information 24 as shown in FIG. 1. In still other examples, identification module 62 may communicate with remote server 32 of FIG. 1 to send request message 30 and receive response message 34.

Computing device 2, in some examples, further includes profile database 64. For example, remote database 64 may include Relational Database Management System (RDBMS) software. In one example, remote database 64 may be a relational database and accessed using a Structured Query Language (SQL) interface that is well known in the art. Remote database 64 may alternatively be stored on a separate networked computing device and accessed by remote server 64 through a network interface or system bus. Remote database 64 may in other examples be an Object Database Management System (ODBMS), Online Analytical Processing (OLAP) database or other suitable data management system.

Any applications, e.g., applications 58 or identification application 60, implemented within or executed by computing device 2 may be implemented or contained within, operable by, executed by, and/or be operatively/communicatively coupled to components of computing device 2, e.g., processors 40, memory 42, network interface 44, and/or storage devices 46.

Figure 3:
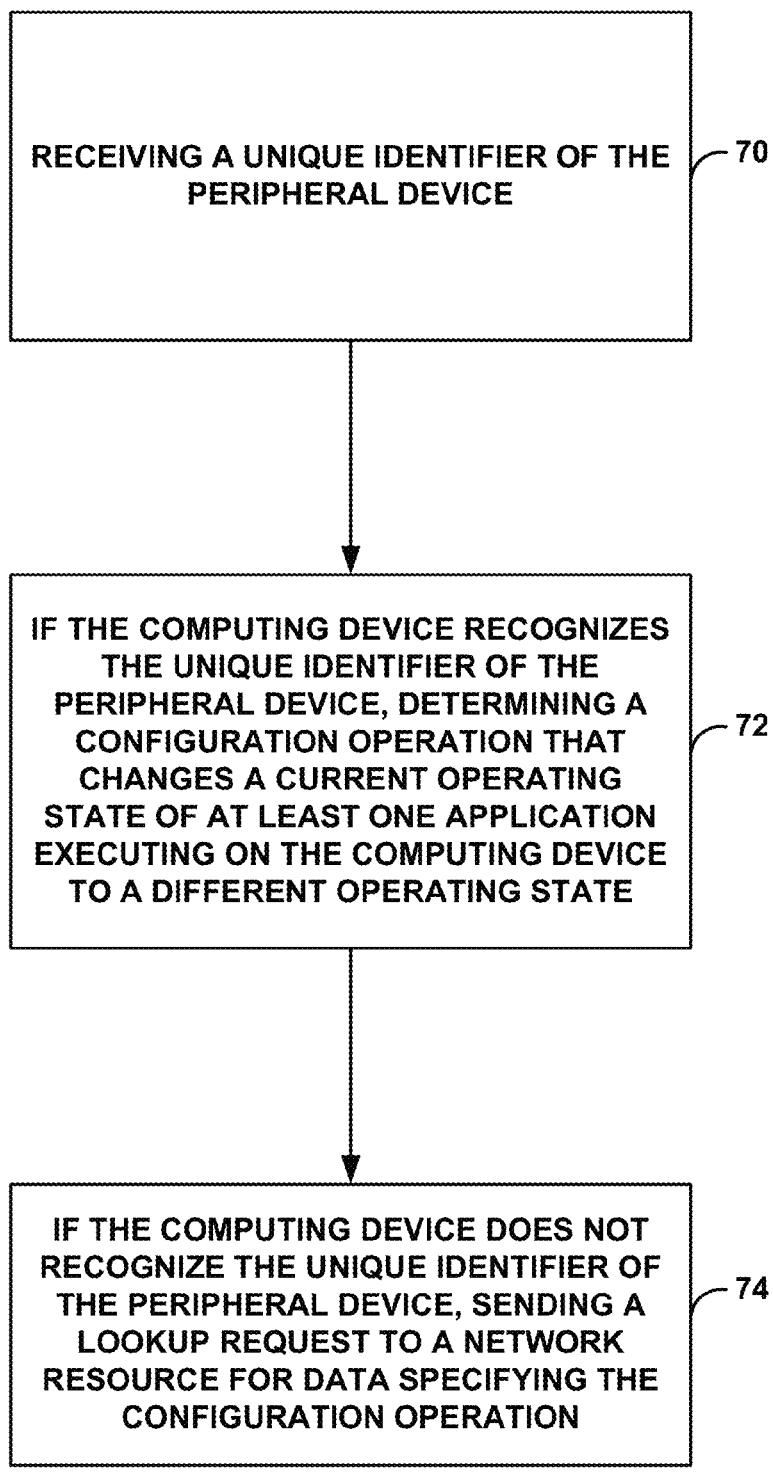
FIG. 3 is a flow diagram illustrating an example method that may be performed by a computing device to receive an unique identifier from a peripheral device and perform one or more configuration operations, in accordance with one or more aspects of the present disclosure.

FIG. 3 is a flow diagram illustrating an example method that may be performed by a computing device to receive a unique identifier from a peripheral device and perform one or more configuration operations, in accordance with one or more aspects of the present disclosure. For example, the method illustrated in FIG. 3 may be performed by computing device 2 shown in FIGS. 1 and/or 2.

The method of FIG. 3 includes, receiving, by a computing device that communicates with a peripheral device using short-range wireless communication, a unique identifier of the peripheral device (70). The method further includes, if the computing device recognizes the unique identifier of the peripheral device, determining, by the computing device, a configuration operation for the computing device based on the unique identifier, wherein the configuration operation changes a current operating state of at least one application executing on the computing device to a different operating state (72). The method further includes, if the computing device does not recognize the unique identifier of the peripheral device, sending, by the computing device, a lookup request to a network resource external to the computing device, wherein the lookup request includes a request to the network resource for data specifying the configuration operation for the computing device based on the unique identifier of the peripheral device (74).

In some examples, the method further includes generating, by the computing device, a message including data that defines a second configuration operation, wherein the second configuration operation changes a second current state of at least one application executing on a second computing device to a second, different operating state; and sending, by the computing device, the message to the second computing device. In some examples, the message includes receiving, by the computing device that communicates with a peripheral device using short-range wireless communication a data payload, the data payload including information that changes the current operating state of the at least one application executing on the computing device to the different operating state. In some examples, the lookup request including the request to the network resource for data specifying the configuration operation includes the data payload, wherein the configuration operation is based on the information of the data payload. In some examples, the method further includes receiving a content type, and wherein the configuration operation changes the current operating state of the at least one application executing on the computing device to the different operating state when the at least one application is associated with the content type, and wherein the content type further includes an attribute that associates the configuration operation with a group of one or more applications executing on the computing device. In some examples, registering, by the computing device, the at least one application of the computing device with the content type, wherein registering the at least one application further includes generating a first association between the at least one application and the content type; and registering, by the computing device, the content type with the configuration operation, wherein registering the content type further includes generating a second association between the content type and the configuration operation.

In some examples, the method further includes storing, by the computing device in a database, a profile associated with the unique identifier, wherein the profile includes a definition of the configuration operation. In some examples, the method further includes sending, by the computing device, a short-range wireless communication broadcast to request the unique identifier from the peripheral device. In some examples, the unique identifier further includes a cryptographic key. In some examples, the short-range wireless communication includes a Near Field Communication. In some examples, the method further includes receiving a data payload that includes data associated with the peripheral device. In some examples, the at least one application executing on the computing device includes an operating system executing on the computing device.

In some examples, the method further includes providing the data payload for use by the configuration operation. In some examples, the method includes changing the current operating state of at least one application executing on the computing device to a different operating state further includes changing a unique configuration of the at least one application, wherein the unique configuration includes data of the at least one application and a group of instructions of the at least one application operating on the data at a point in time. In one example, the method includes generating, by the computing device, an association between the configuration operation and the at least one application, wherein the computing device uses the association to identify the configuration operation associated with the at least one application.

In some examples, the method includes further registering, by the computing device, the at least one application of the computing device with the unique identifier, wherein registering the at least one application further includes generating an association between the at least one application of the computing device and the unique identifier, wherein the computing device uses the association to identify the at least one application associated with unique identifier. In some examples, the peripheral device further includes a docking station, short-range communication tag, laptop, backup device, printer, scanner, or mobile phone.

In some examples, if the computing device does not recognize the unique identifier of the peripheral device, sending, by the computing device, the lookup request to the network resource external to the computing device further includes: generating, by the computing device, the lookup request, wherein the lookup request includes the unique identifier; sending, by the computing device, the lookup request to the network resource; and receiving, by the computing device, data usable by the computing device to retrieve an application associated with the unique identifier. In some examples, the method includes: receiving, by the computing device, a user input to install the application; selecting, by the computing device, the application based on the unique identifier; and installing the selected application on the computing device.

Figure 4:
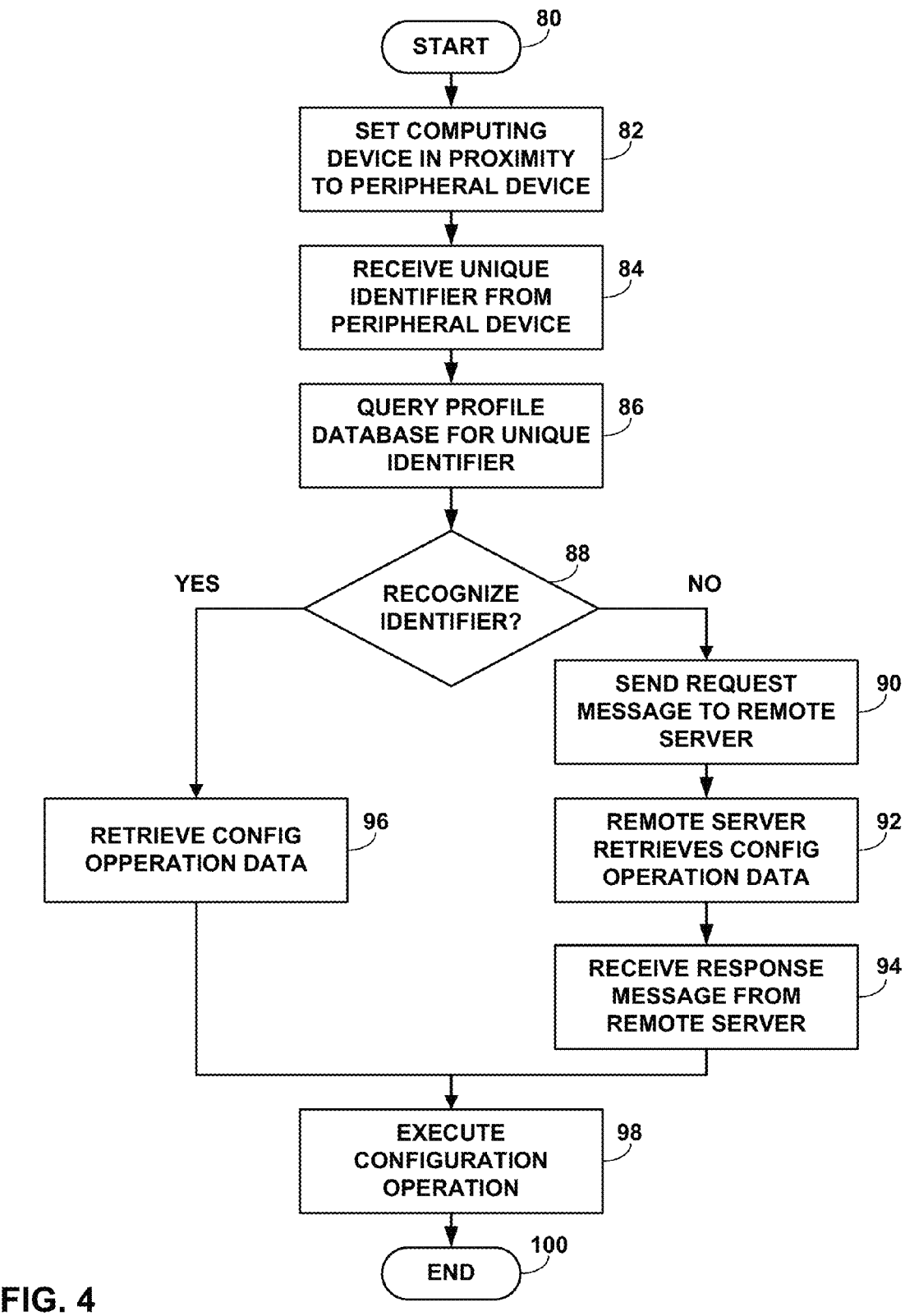
FIG. 4 is a flow diagram illustrating an example use case of a mobile device, in accordance with one or more aspects of the present disclosure.

FIG. 4 is a flow diagram illustrating an example use case of a mobile device, in accordance with one or more aspects of the present disclosure. In an example use case, a user may attend a football game and bring the computing device with the user to the football game. The user's computing device, e.g., an Android™ smartphone, may include an identification application as shown in FIG. 1 and a ticket application. The ticket application may include an admission credential that indicates the user has paid to be admitted to the football game. In some examples, the ticket application may also be configured to communicate the admission credential to a peripheral device using short-range communication. For example, the identification application executing on the smart phone may recognize a peripheral device that receives the admission credential. In response to recognizing the peripheral device, the identification application may execute a configuration operation that causes the ticket application to communicate the admission credential to the peripheral device.

When the user arrives at the entrance to the football venue, the user may be required to pass through a ticketing gate. The ticketing gate may include a peripheral device capable receiving the admission credential. For example, the user may position the smartphone in proximity to the peripheral device (82). The smartphone may use short-range communication to receive a unique identifier from the peripheral device (84). Using the unique identifier, the identification application executing on the smartphone may query a profile database to identify configuration operations associated with the unique identifier (86). In the current example, the user has previously configured the ticket application and identification application, therefore, the identification application may recognize the unique identifier (88). The identification application may retrieve definitions of configuration operations associated with the unique identifier (96). In some examples, the identification application may execute the configuration operation that causes the ticket application to send the admission credential to the peripheral device (98).

The user may sit in a seat in the football venue specified by the ticket credential to watch the football game. A short-range communication tag may be attached to or in physical proximity to the seat. When the user sits in the seat, the smartphone may be in proximity to the short-range communication tag (82). The smartphone, may therefore, receive a unique identifier from the short-range communication tag (84). The identification application executing on the smartphone may query the profile database to identify configuration operations associated with the unique identifier (86). Because no configuration operations are associated with the unique identifier in the profile database in this particular use case, the unique identifier is not recognized by the identification application (88).

The identification application executing on the smartphone may send a request message to a remote server that includes unique identifier (90). In some examples, the request message may cause the remote server to retrieve configuration operations associated with unique identifier (92). In the current example, configuration operations associated with the unique identifier may include switching the smartphone ringer setting to vibrate, installing and launching a football statistics application, and/or displaying information including food prices and restroom locations within the football venue. The smartphone may in turn receive definitions of the configuration operations (94). Upon receiving the definitions of the configuration operations, the identification operation may execute the configuration operations (98).

Figure 5:
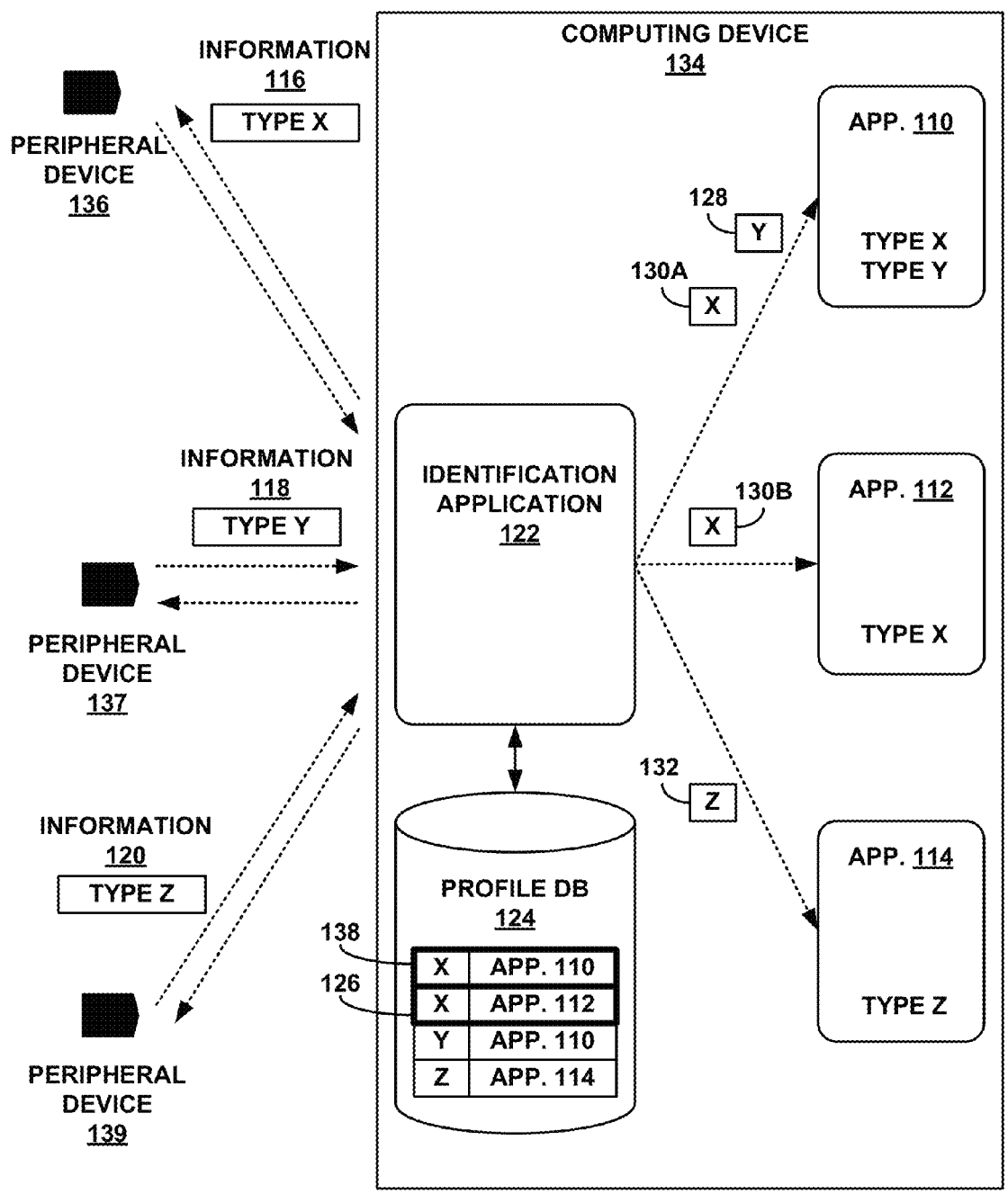
FIG. 5 is a block diagram illustrating an example of an identification application that may be configured to execute configuration operations based on content types, in accordance with one or more aspects of the present disclosure.

FIG. 5 is a block diagram illustrating an example of an identification application 122 that may be configured to execute configuration operations based on content types, in accordance with one or more aspects of the present disclosure. In some examples, applications executing on computing device 134 may register with identification application 122 according to a particular content type. In one example, a content type may be an attribute that is associated with a unique identifier. In another example, a content type may be an attribute associated with a peripheral device and received as information by computing device 134. In one example, identification application 122 receives information from a peripheral device that includes a content type. A content type may enable identification application 122 to perform configuration operations on one or more applications according to the content type. In other examples, a content type may enable identification application 122 to send data payload to one or more applications according to the content type. One example of a content type may include AUDIO_APPLICATION. The content type AUDIO_APPLICATION may be used to identify any of applications 110, 112, 114 that cause computing device 134 to output an audio signal. Another content type may be NETWORK_APPLICATION. The content type NETWORK_APPLICATION may be used to identify any of applications 110, 112, 114 that cause computing device 134 to perform network communication. The aforementioned content types, while illustrated in examples as character strings, may be implemented in any number of ways that uniquely represent each content type.

In some examples, one or more applications 110, 112, 114 executing on computing device 134 may be registered with identification application 122 based on various content types. In one example of registering an application based on a content type, a user may configure identification application 122 to associate an application and a content type. For example, a user may associate application 112 with content type X using identification application 122. Identification application 122 may store association 126 between application 110 and content type X in profile database 124. In another example, a user may associate application 112 with content type AUDIO_APPLICATION (not shown). Identification application 122 may store the association (not shown) between application 110 and content type AUDIO_APPLICATION in profile database 124.

In some examples, a user that registers an application with a content type may further define configuration operations associated with a content type. In one example, a configuration operation may include shutting down an application. In another example, a configuration operation may include sending a data payload to one or more applications.

In some examples, identification application 122 performs configuration operations based on the content type of the information received by computing device 134. For example, a user may initially register applications 110, 112 with identification application 122 based on content type X. The user may further define a configuration operation that sends the data payload of any information of content type X to applications registered with content type X. In one example, identification application 122 may receive information 116 from peripheral device 136. Information 116 may be of content type X. Upon receiving information 116, identification application 122 may query profile database 124 to identify applications registered with content type X. For example, profile database 124 may include associations 138, 126 that associate applications 110, 112 to content type X.

Identification application 122 may retrieve the definition of a configuration operation associated with content type X from profile database 124. The configuration operation associated with content type X may be executed or otherwise performed by identification application 122. Executing the configuration operation may cause identification application 122 to send the data payload of information 116 to applications 110, 112 because applications 110, 112 are registered with identification application 122 based on content type X. For example, data payloads 130A, 130B may correspond to the data payload of information 116. Identification application 122 may send data payloads 130A, 130B to applications 110, 112 because each these applications are registered with identification application 122 based on content type X. One example of content type X may include NETWORK_APPLICATION.

The corresponding data payloads 130A, 130B may include data indicating the latency and bandwidth of the network connection. Network usage and operation of applications 110, 112 may, for example, change in response to the bandwidth and latency of network connection to provide optimal performance.

In another example, identification application 122 may receive information 118 from peripheral device 137, which may be of content type Y. Profile database 124 may include a definition of a configuration operation that terminates execution of any application registered with content type Y. In response to receiving information 118, identification application 122 may query profile database 124 to determine that application 110 is associated with content type Y. Identification application 122 may send data 128 to application 110 that causes execution of application 110 to terminate because application 110 is registered with identification application 122 based on content type Y.

In another example, identification application 122 may receive information 120 from peripheral device 139, which may be of content type Z. Profile database 124 may include a definition of a configuration operation that causes an application registered with content type Z to initiate a connection with another device in proximity to computing device 134. In response to receiving information 120, identification application 122 may query profile database 124 to determine that application 114 is associated with content type Z. Identification application 122 may notify all applications executing on computing device 134 that data associated with content type Z may be retrieved from identification application 122. Application 114 may retrieve data 132, which may in turn initiate a connection with another device in proximity to computing device 134 from identification application 122. One example of content type Z may be AUDIO_APPLICATION. The corresponding data payload 132 may include data that indicates the operating environment of computing device 134 has substantial background noise. Audio volume of application 114 may, for example, increase from a present setting to a higher new setting to ensure the user can hear the audio output generated by application 114.

Figure 6:
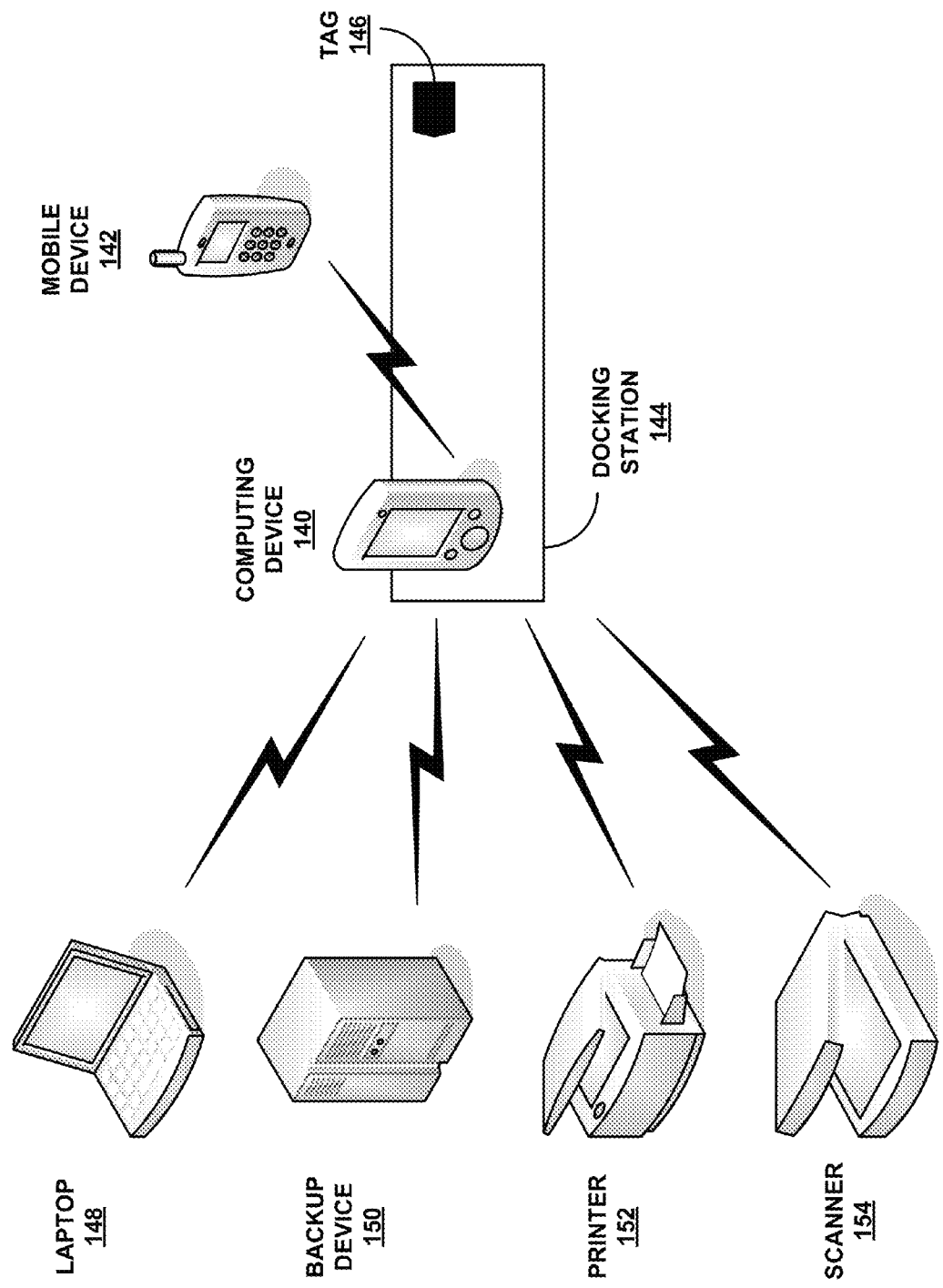
FIG. 6 is a block diagram illustrating an example of a computing device configured to communicate with other devices if a tag is detected by the computing device using short-range communication, in accordance with one or more aspects of the present disclosure.

FIG. 6 is a block diagram illustrating an example of a computing device 140 configured to communicate with other devices when a tag 146 is detected by computing device 140 using short-range communication, in accordance with one or more aspects of the present disclosure. Tag 146 may in some examples be a short-range communication tag. In some examples, tag 146 may be attached or in physical proximity to docking station 144.

In some examples, computing device 140, employing techniques of the present disclosure, may be placed on or near a peripheral device, e.g., docking station 144. Docking station 144 may provide, for example, power and/or network connectivity to computing device 140. Other devices may be in physical proximity to docking station 144 such as mobile device 142, laptop 148, backup device 150, printer 152, and/or scanner 154.

In some examples, computing device 140 may be configured to initiate communication with one or more devices in physical proximity to computing device 140 when tag 146 is detected. For example, a user may initially register a communication application executing on computing device 140 with a unique identifier of tag 146. In some examples, the communication application may be capable of enabling computing device 140 to communicate with other devices. The user may also define a configuration operation associated with the unique identifier of tag 146. The configuration operation may initiate and/or configure the communication application to communicate with other devices.

When computing device 140 is placed in docking station 144, computing device 140 may detect tag 146 using short-range communication. Computing device 140 may use the unique identifier of tag 146 to execute the configuration operation, which initiates and/or configures the communication application executing on computing device 140. The communication application may then communicate with other devices, for example, mobile device 142, laptop 148, backup device 150, printer 152, and/or scanner 154.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:

1. A method comprising:
   receiving, by a computing device using short-range wireless communication, first data from a short-range communication tag;
   responsive to receiving the first data, determining, by the computing device, that the computing device does not recognize a unique identifier of the short-range communication tag in the first data;
   responsive to determining that the computing device does not recognize the unique identifier of the short-range communication tag in the first data:
      sending, by the computing device and to a network resource, a lookup request comprising at least a portion of the first data, wherein the lookup request comprises a request to the network resource for second data specifying a configuration operation for the computing device, and
   receiving, by the computing device, the second data specifying the configuration operation for the computing device based on the first data received via the short-range wireless communication.

2. The method of claim 1, wherein the configuration operation is a first configuration operation, wherein the computing device is a first computing device, wherein performing the first configuration operation for the computing device further comprises:
   generating, by the computing device, third data that defines a second configuration operation, wherein the second configuration operation changes a current state of at least one application executing on a second computing device to a different operating state; and
   sending, by the computing device, the third data to the second computing device.

3. The method of claim 1, further comprising:
   registering, by the computing device, the at least one application of the computing device with the unique identifier, wherein registering the at least one application further comprises generating an association between the at least one application of the computing device and the unique identifier, wherein the computing device uses the association to identify the at least one application associated with unique identifier.

4. The method of claim 1, wherein sending, by the computing device, the lookup request to the network resource further comprises:
   generating, by the computing device, the lookup request, wherein the lookup request includes the unique identifier; and
   sending, by the computing device, the lookup request to the network resource, wherein the second data is usable by the computing device to retrieve an application associated with the unique identifier.

5. The method of claim 4, further comprising:
   receiving, by the computing device, a user input to install the at least one application;
   selecting, by the computing device, the at least one application based on the unique identifier; and
   installing the at least one application on the computing device.

6. The method of claim 1, further comprising:
   receiving a content type, and wherein the configuration operation changes the current operating state of the at least one application executing on the computing device to the different operating state when the at least one application is associated with the content type, and wherein the content type further comprises an attribute that associates the configuration operation with a group of one or more applications of the computing device.

7. The method of claim 6, further comprising:
registering, by the computing device, the at least one application of the computing device with the content type, wherein registering the at least one application further comprises generating a first association between the at least one application and the content type, wherein the computing device uses the first association to identify the at least one application associated with the content type; and
registering, by the computing device, the content type with the configuration operation, wherein registering the content type further comprises generating a second association between the content type and the configuration operation, wherein the computing device uses the second association to identify the configuration operation associated with the content type.

8. The method of claim 1, wherein the short-range wireless communication comprises at least one of Near Field Communication or Bluetooth.

9. A computing device comprising:
at least one processor; and
at least one module operable by the at least one processor to:
receive, using short-range wireless communication, first data from a short-range communication tag;
responsive to receiving the first data, determine that the computing device does not recognize a unique identifier of the short-range communication tag in the first data;
responsive to determining that the computing device does not recognize the unique identifier of the short-range communication tag in the first data:
send, to a network resource, a lookup request comprising at least a portion of the first data, wherein the lookup request comprises a request to the network resource for second data specifying a configuration operation for the computing device based on the first data received via the short-range wireless communication, and
receive the second data specifying the configuration operation for the computing device based on the first data received via the short-range wireless communication.

10. The computing device of claim 9, wherein the computing device is a first computing device, wherein the at least one module is operable by the at least one processor to:
generate third data that defines a second configuration operation, wherein the third configuration operation changes a current state of at least one application executing on a second computing device to a different operating state; and
send the third data to the second computing device.

11. The computing device of claim 9, wherein the at least one module is operable by the at least one processor to:
register the at least one application of the computing device with the unique identifier, wherein registering the at least one application further comprises generating an association between the at least one application of the computing device and the unique identifier, wherein the computing device uses the association to identify the at least one application associated with unique identifier.

12. The computing device of claim 9, wherein the at least one module is operable by the at least one processor to:
generate the lookup request, wherein the lookup request includes the unique identifier; and
send the lookup request to the network resource, wherein the second data is usable by the computing device to retrieve an application associated with the unique identifier.

13. The computing device of claim 12, wherein the at least one module is operable by the at least one processor to:
receive a user input to install the at least one application;
select the at least one application based on the unique identifier; and
install the at least one application on the computing device.

14. The computing device of claim 9, wherein the at least one module is operable by the at least one processor to:
receive a content type, and wherein the configuration operation changes the current operating state of the at least one application executing on the computing device to the different operating state when the at least one application is associated with the content type, and wherein the content type further comprises an attribute that associates the configuration operation with a group of one or more applications of the computing device.

15. The computing device of claim 14, wherein the at least one module is operable by the at least one processor to:
register the at least one application of the computing device with the content type, wherein registering the at least one application further comprises generating a first association between the at least one application and the content type, wherein the computing device uses the first association to identify the at least one application associated with the content type; and
register the content type with the configuration operation, wherein registering the content type further comprises generating a second association between the content type and the configuration operation, wherein the computing device uses the second association to identify the configuration operation associated with the content type.

16. The computing device of claim 9, wherein the short-range wireless communication comprises at least one of Near Field Communication or Bluetooth.

17. A non-transitory computer-readable storage medium encoded with instructions that cause one or more processors of a computing device to:
receive, using short-range wireless communication, first data from a short-range communication tag;
responsive to receiving the first data, determine that the computing device does not recognize a unique identifier of the short-range communication tag in the first data;
responsive to determining that the computing device does not recognize the unique identifier of the short-range communication tag in the first data:
send, to a network resource, a lookup request comprising at least a portion of the first data, wherein the lookup request comprises a request to the network resource for second data specifying a configuration operation for the computing device based on the first data received via the short-range wireless communication, and
receive the second data specifying the configuration operation for the computing device based on the first data received via the short-range wireless communication.

18. The non-transitory computer-readable storage medium of claim 17, encoded with instructions that cause one or more processors of a computing device to:
generate the lookup request, wherein the lookup request includes the unique identifier; and send the lookup request to the network resource, wherein the second data is usable by the computing device to retrieve an application associated with the unique identifier.

19. The non-transitory computer-readable storage medium of claim 18, encoded with instructions that cause one or more processors of a computing device to:
  receive a user input to install the at least one application;
  select the at least one application based on the unique identifier; and
  install the at least one application on the computing device.

20. The non-transitory computer-readable storage medium of claim 17, encoded with instructions that cause one or more processors of a computing device to:
  receive a content type, and wherein the configuration operation changes the current operating state of the at least one application executing on the computing device to the different operating state when the at least one application is associated with the content type, and wherein the content type further comprises an attribute that associates the configuration operation with a group of one or more applications of the computing device.

* * * * *